United States Patent
Muir et al.

(10) Patent No.: US 6,661,882 B1
(45) Date of Patent: Dec. 9, 2003

(54) SYSTEM AND METHOD FOR AUTOMATED TELEPHONE MESSAGE ROUTING USING AN ALTERED ANI

(75) Inventors: Jimmie L. Muir, Hartford, SD (US); John Wood, Solon, IA (US); Curtis A. Van Oort, Brandon, SD (US); David L. Wooters, Brandon, SD (US); Mark P. Ambrose, Valley Cottage, NY (US); Craig Heier, Reston, VA (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/558,174

(22) Filed: Apr. 26, 2000

(Under 37 CFR 1.47)

Related U.S. Application Data

(60) Provisional application No. 60/131,120, filed on Apr. 27, 1999.

(51) Int. Cl.$^7$ .................... H04M 15/00; H04M 15/06; H04M 3/00
(52) U.S. Cl. ................... 379/127.01; 379/142.01; 379/265.02; 379/265.13
(58) Field of Search ................. 379/265, 266, 379/309

(56) References Cited

U.S. PATENT DOCUMENTS

| | | | | |
|---|---|---|---|---|
| 5,867,562 A | * | 2/1999 | Scherer | 379/112 |
| 5,884,032 A | * | 3/1999 | Bateman et al. | 709/204 |
| 5,901,209 A | * | 5/1999 | Tannenbaum et al. | 379/142 |
| 5,987,115 A | * | 11/1999 | Petrunka et al. | 379/265 |
| 6,137,870 A | * | 10/2000 | Scherer | |
| 6,163,607 A | * | 12/2000 | Bogart et al. | 379/265.02 |

* cited by examiner

*Primary Examiner*—Ahmad F. Matar
*Assistant Examiner*—Hector Agdeppa
(74) *Attorney, Agent, or Firm*—George T. Marcou; Kilpatrick Stockton LLP

(57) ABSTRACT

The present invention provides a system and method of transferring a call signal including call-related data received from a communications system between a host and at least one remote agent terminal connected through a network, where the host can access at least one application database for storing and retrieving information associated with each service that each agent terminal is to handle, and each agent terminal can access the at least one application database computer system for storing and retrieving information associated with each service that each agent terminal is to handle, the method comprising the steps of: (a) at the host (i) transferring initial information contained in an ANI field associated with the call signal into the at least one application database, (ii) associating that initial information contained in the ANI field with other information regarding the source of the call signal, and (iii) replacing the initial information contained in the ANI field associated with the call signal with subsequent information contained in the ANI field directing an agent terminal to a portion of the at least one application database that contains the initial information contained in the ANI field associated with the call signal and the other information regarding the source of the call signal; (b) transferring the call and the subsequent information contained in the ANI field from the host to the at least one agent terminal by transferring the voice portion of the call to a voice communication device of the at least one agent terminal, and transmitting the subsequent information contained in the ANI field directing the at least one agent terminal to the portion of the database that contains the initial information contained in the ANI field associated with the call signal and the other information regarding the source of the call signal; (c) at the agent terminal, (1) receiving the call signal and information contained in the ANI field directing the at least one agent terminal to the portion of the database that contains the initial information contained in the ANI field associated with the call signal and the other information regarding the source of the call signal.

12 Claims, 3 Drawing Sheets

US 6,661,882 B1

SYSTEM AND METHOD FOR AUTOMATED TELEPHONE MESSAGE ROUTING USING AN ALTERED ANI

CONTINUING DATA

This application claims priority to U.S. provisional application No. 60/131,120, entitled "System and Method for Automated Telephone Message Routing Using Manipulated ANI," filed on Apr. 27, 1999, incorporated herein by reference.

BACKGROUND OF THE INVENTION

1. Field of the Invention

The present invention relates generally to call center messaging systems and, more particularly, to an enhanced automated routing system for telephone messages in which the automatic number identification (ANI) is altered so as to provide information about the call, to direct the call to appropriate service personnel, and to offer services and products to a caller.

2. Description of the Related Art

Typically, when a telephone call from a consumer to an organization, such as a financial institution, is transferred from an integrated voice response (IVR) agent, an internal on-premise messaging system enables the host to keep track of the particular IVR extension from which the call was transferred, as well as the extension of the agent to which the call is transferred. The messaging system generates a screen pop that is associated with the incoming caller and inserts the caller's account number. The information pops out to the agent's screen to whom the call is transferred, so the agent does not have to ask the caller for the account number information again.

However, when using a network integrated voice response (NIVR) platform by the institution for transferring calls, there is no longer a correlation between an IVR port and a NIVR port, because there is such a large pool of ports. Thus, there was no way for the switch to ascertain which port on the NIVR had the incoming call to begin with.

The ANI field is usually the location for the telephone number of the telephone originating the call. Formerly, the ANI was delivered to any one of a number of automated call directors (ACD's), for example, a PBX or telephone switch. Conventionally, in a remote IVR process, it was necessary to have a hard-line data system that married the original call coming into an NIVR to the site to which it was going.

There have been a variety of approaches to providing a definable integrated voice/data call transfer technique. For example, U.S. Pat. No. 5,008,930 to Gawrys et al. discloses a customer programmable integrated voice/data call transfer technique for use in telemarketing.

U.S. Pat. No. 5,206,903 to Kohler et al. discloses automated call distributing equipment that uses the ANI to anticipate the needs of each calling party. Hence, the caller is automatically transferred/forwarded to an agent who is best suited to satisfy the callers needs.

U.S. Pat. No. 5,696,809 to Voit discloses an intelligent network service control point (AIN SCP) with sufficient information to effectively route a customer initiated call to an agent to an appropriate destination.

U.S. Pat. No. 5,867,562 to Scherer discloses a call processor which analyzes the ANI of a received call in view of info-indicator digits.

U.S. Pat. No. 5,915,010 to McCalmont discloses a call center scheme where a customer service representative (CSR) receives a call via automated call distribution. The CSR may determine that the call should be transferred. The call is transferred to a second CSR with all the caller's information along with a reason for the transfer.

U.S. Pat. No. 5,937,051 to Hurd et al. discloses a method of coordinating a voice component and a data component of a call that arrives at a workstation of a first call center and transferring the call across a switching network to a second workstation at a second call center.

U.S. Pat. No. 5,696,809 to Voit discloses an intelligent network service control point (AIN SCP) with sufficient information to effectively route a customer initiated call to an appropriate destination.

However, despite these attempts to provide a network integrated voice response platform which permits alteration of the automatic number identification (ANI) so as to provide information about the call, to direct the call to appropriate service personnel, and to offer services and products to a caller, there still remains a need for such a system.

BRIEF SUMMARY OF THE INVENTION

It is a feature and advantage of the present invention to provide a system and method for automated telephone message routing which imbeds information about an incoming caller in the ANI field, so that the information is available at the agent's desktop, regardless of where the call is transferred by the system.

It is another feature and advantage of the present invention to provide an automated telephone message routing system which uses information about the caller embedded in the ANI field to route the caller to an agent specially trained to deal with the particular type of caller.

It is a further feature and advantage of the present invention to provide an automated telephone message routing system which uses information about the caller embedded in the ANI field to route the caller to a particular agent according to purchasing preferences of the caller.

It is an additional feature and advantage of the present invention to provide an automated telephone message routing system which uses information about the caller embedded in the ANI field to route the caller to a particular agent according to potential purchasing preferences of the caller.

To achieve the stated and other features, advantages and objects, an embodiment of the present invention provides a system and method for automated routing of telephone messages utilizing manipulated automatic number identification (ANI). The system and method of and embodiment of the present invention provides each call that comes into the integrated voice response (IVR) system with a session identification (ID) that is held onto by the host. In order to get the session ID to a call center and then back up to the host so that it can be matched, the system and method of the present invention utilizes the ANI field.

The ANI field is the usual location for the telephone number of the person who originated the call. The system and method of the present invention eliminates the need for the ANI field. The ten digits are used for information about the incoming calls, and the original ANI of the caller is discarded. For example, when a caller calls from the caller's home, the ANI field is the caller's home telephone number, such as the caller's area code and seven digit telephone number. The system and method of the present invention, basically throws that information in the bit file and uses those ten digits to tell the financial institution something that it wants to know about the call, such as the session ID.

Formerly, the ANI was delivered to any one of a number of automated call directors (ACD's), for example, a PBX or telephone switch. According to an embodiment of the present invention, the telephone switch passes what it thinks is the ANI field up to the host, but the host knows in fact that it is not an ANI. Rather, inside those ten digits is a five digit field that tells the system where to go in its temporary storage to get the information about the original call in the IVR in order to pop to the agent's screen. Thus, the ANI becomes a dynamic field that is used to pass information about the caller to the host, as opposed to really knowing the original ANI, about which the system no longer cares.

In the past, in doing any kind of IVR process remotely, it was necessary to have a hard-line data process that married the original call coming into an NIVR to the site to which it was going in order to be serviced. It was necessary, for example, for the financial institution to have one site, for example, in California, where the NIVR was located, another site, for example, in Nevada, where the agents were located, and if it was necessary to transfer the call, for example, to Maryland, the call could be transferred, but the screen pop would be lost. The system and method of an embodiment of the present invention utilizes the manipulated ANI to divorce the requirement of having the two sites married. The system embeds information, for example, about the caller in the ANI field which is goes with the call for the life of the call. Therefore, no matter where the call ends up, the host can find the information about the call and present the screen pop to the agent.

These and other objects, advantages and novel features of the invention will be set forth in part in the description which follows, and in part with become more apparent to those skilled in the art upon examination of the following or may be learned by practice of the invention.

DETAILED DESCRIPTION OF THE INVENTION

To accomplish the agent-skill routing and the above sales objectives, among others, the present invention, according to a first embodiment, provides a system and method for concurrent delivery of voice and text or computer data to a service agent using an intelligent network based information distribution system. The system includes a central office switching system connected to communication lines including at least one service switching point for selectively providing switched communications between the communication lines, and a network controller arranged for selectively providing control data to effect land line communications, and arranged separately from the central office switching system. The network controller is preferably connected to the at least one service switching point through at least one service transfer point arranged to convey control data to effect communications. The network controller stores preprogrammed call processing data associated with subscribers who are associated with one of the communication lines connected to the central office switching system, and also stores preprogrammed call processing data associated with subscribers. The system also includes an intelligent peripheral/call server combination, responsively connected to, and disposed between, the network controller and the central office switching system, and external databases responsively connected to the intelligent peripheral/call server combination, storing subscriber specific data associated with each of the subscribers. The network controller determines the appropriate central office switching system to route a customer initiated call, and the IP/call server acquires queue status from the central office switching system and transmits the queue status to the network controller. The network controller requests data to the IP/call server regarding queue status, and the current queue status is played to the customer. The IP/call server extracts the data from at least one of the external databases and arranges for the customer initiated call to be transferred to a queue of the appropriate central office switching system. The IP/call server transmits the subscriber specific data including a customer data screen to a service agent computer system for concurrent delivery with voice. The central office switching system transmits voice data of the customer initiated call to the agent substantially concurrently with the subscriber specific data.

Figure 1:
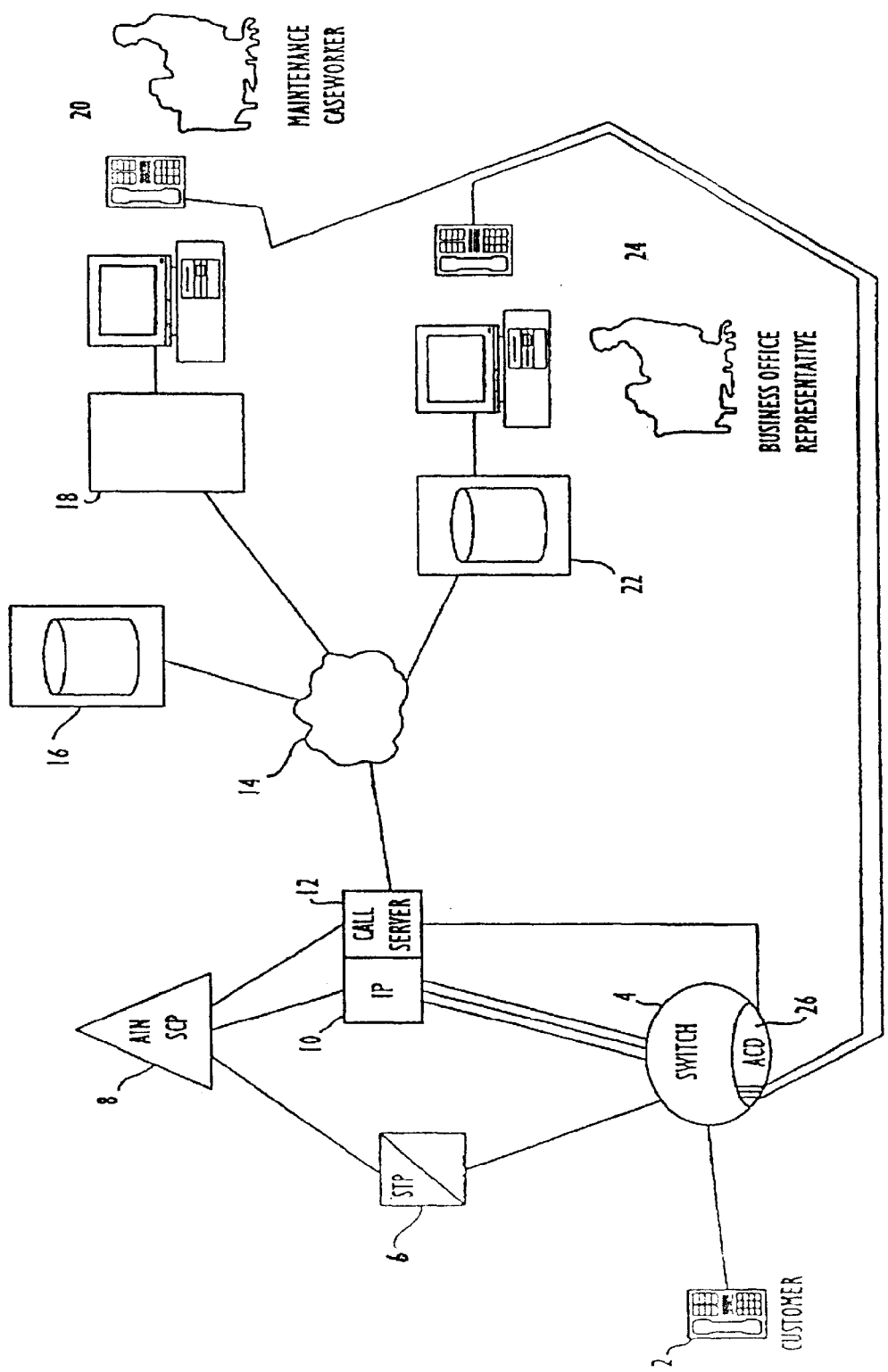
FIG. 1 is a diagram illustrating the basic intelligent network based computer architecture for concurrent delivery of voice and text data and FIG. 2 is a diagram illustrating a preferred embodiment of the present invention.
Figure 2:
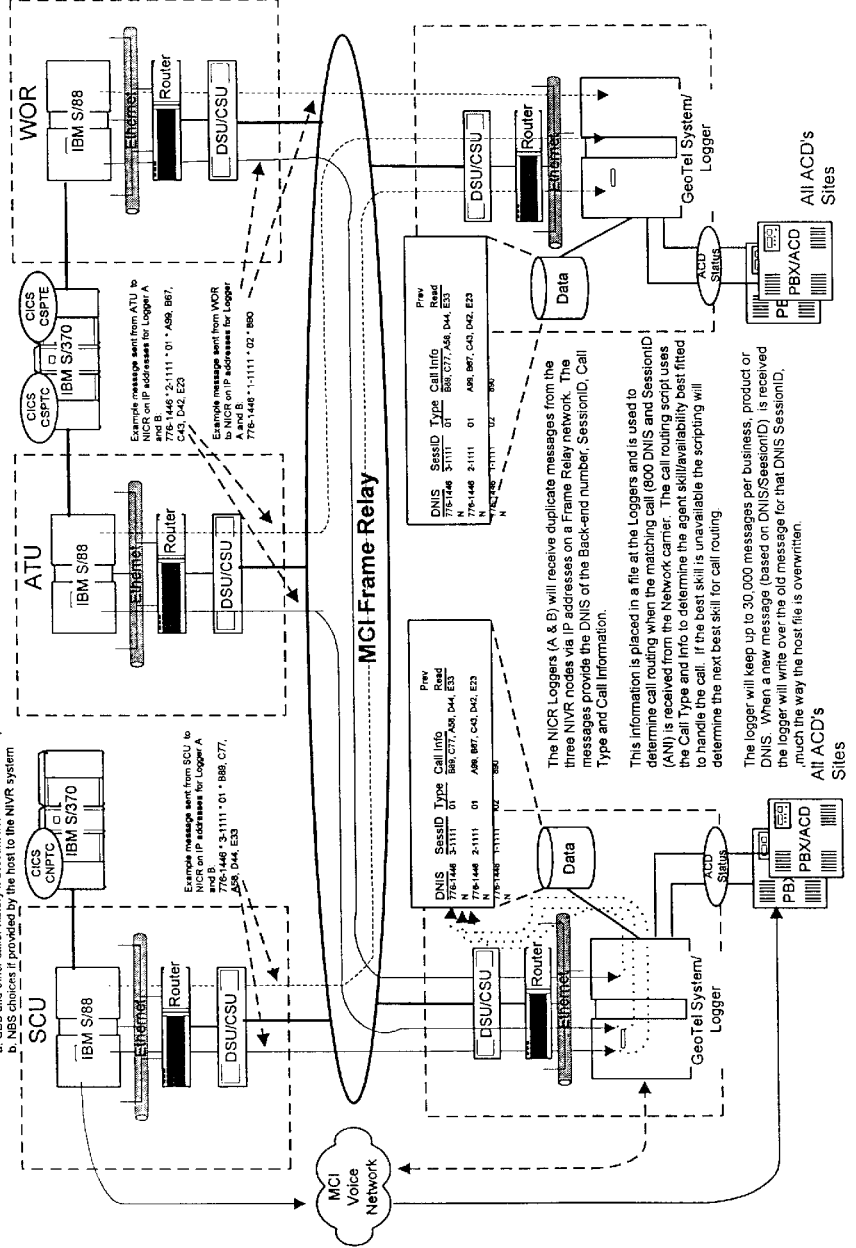
Figure 3:
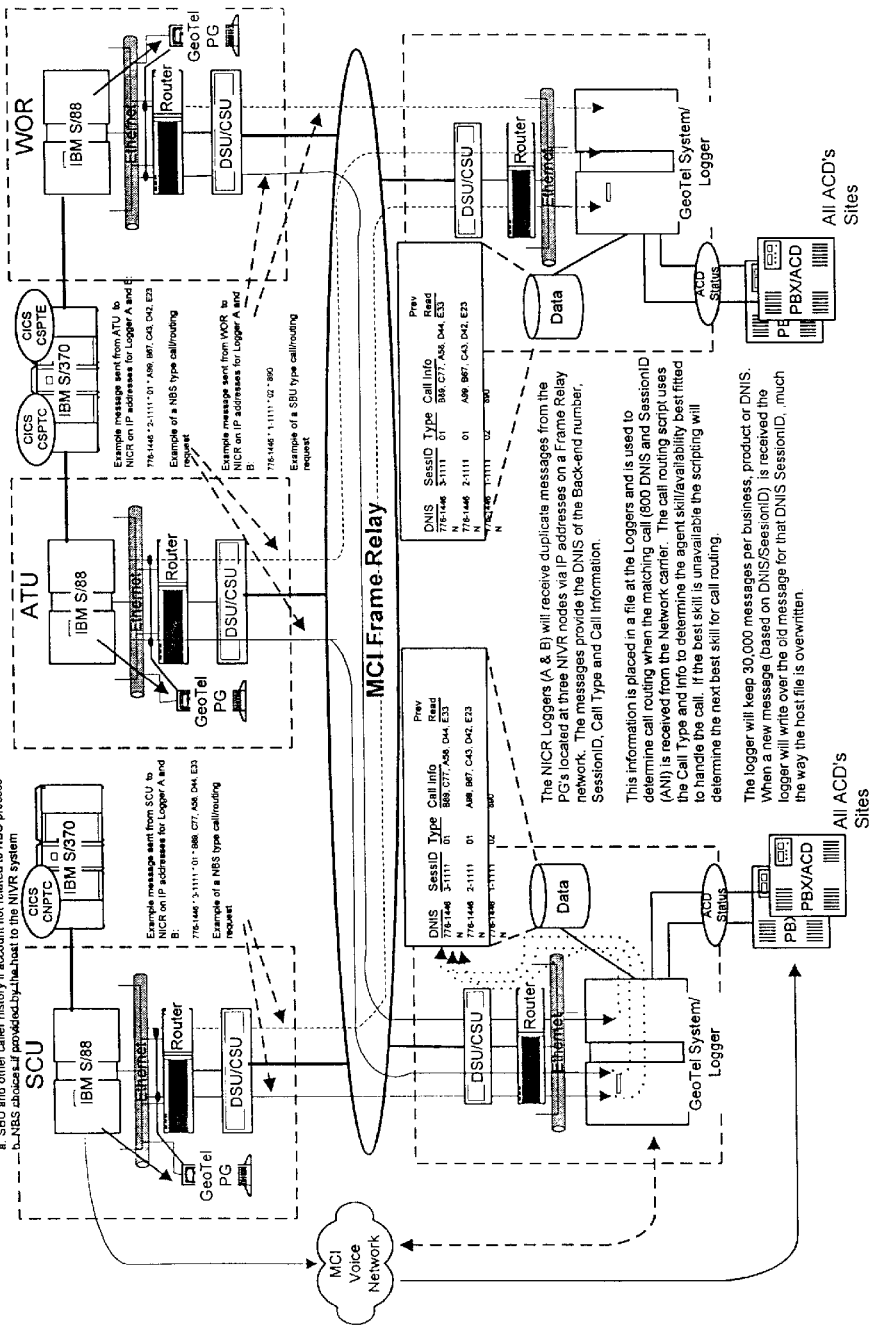
FIG. 3 is a diagram illustrating a preferred embodiment of the present invention.

For example, in FIG. 1 is illustrated the intelligent network based computer architecture for the concurrent delivery of voice and text (or computer) data including a failure management system. The switching network uses one or more central office switches, such as the class 4/5 Switch, are located throughout a state or region served by a telephone operating company (TELCO). Local telephone lines connect the central office switch to individual telephone terminals in each geographic area, for example to the Plain Old Telephone Service (POTS) phones.

The central office switch connects via trunk circuits to one or more remote central offices. The trunk circuits carry large numbers of telephone calls between central offices and/or between a central office and the mobility controllers. Also, each central office has a Common Channel Inter-Office Signalling (CCIS) type data link going to a Signalling Transfer Point (STP). CCIS type data links provide data communication for standard and related special service processing. Also, a CCIS packet switched data link connects the STP to the Server Control Point (SCP).

In general, a customer initiates a call to the business office or repair bureau. This number which the customer dials has a dialed line number (DLN) trigger set on the receiving switch either at the beginning of the call or after the SCP has identified that the call is to be routed to the business office or repair center. Control of the telephone call is passed to the SCP. The SCP then executes a CPR which asks the receiving switch to play two announcements to the customer. The first announcement greets the customers and asks for the telephone number they wish to discuss. The second announcement asks whether the customer wants the business office or the repair bureau. Upon entering the information, the receiving switch then transmits the customer entered information back to the SCP.

The SCP then determines the appropriate work center and ACD destination. The ACD may reside either on the receiving SSP switch or on a different SSP switch. The SCP also includes in the routing of the call to the appropriate SSP switch a code or number which is for an associated IP/call server or standard voice response unit/database query server. The IP/call server provides for interactive voice response capabilities for more sophisticated interaction with the customer and is associated with the correct ACD and the correct business office or repair bureau. The IP/call server may then access the various databases in the business office or repair bureau before the telephone call is routed to the correct work center, and may determine the estimated queue time before the customer will have access to the agent. In addition, the IP/call server may access the required data in the appropriate operation systems of the work center, and simultaneously display customer related information on the work center monitor with the associated telephone call to the agent. An additional feature may include the rerouting of a customer call from the repair bureau to a standardized message when the call server has accessed the appropriate database and has determined that the customer's line has been inventoried as in need of repair.

Referring now in detail to an embodiment of the present invention, the system and method of an embodiment of the present invention makes use of a number of components, including, for example, a network integrated voice response (NIVR) platform, which basically changes the ANI field for an institution, such as a financial institution. An information or key, referred to as the session ID, is embedded in the ANI field, and the information transfers out to a network, such as the MCI or AT&T network. The information is carried in a standard position in which the ANI is normally carried. The information goes to the financial institution's automated call director or PBX, and the PBX hands off the information.

In a one aspect of an embodiment of the present invention, when the PBX actually connects the caller to an agent, the system identifies that this ANI is connected to this agent's extension that goes to the host through a gateway. The host reviews the extension, and reviews the ANI. The host directs the system to gather the session ID associated with the call based on the last five digits of the ANI and provide all information about the caller that is contained there. The host then identifies which terminal is associated with this extension and performs a lookup on a cross reference table. The extension and the terminal name from the table are used to send the information directly to the appropriate terminal, which is one of a number of terminals located at various facilities throughout the United States.

In an embodiment of the present invention, the person at the particular terminal is the agent that talks to the caller. When the caller and agent are connected to one another, the agent already knows the caller to whom she is speaking. The agents, which are situated at the various facilities around the country, are provided, for example, with telephone headsets. From time to time the agents receive what is referred to as a zip tone through their respective headsets. The zip tone alerts the agent that she is just about ready to be connected to a caller. When so alerted, the agent watches his/her terminal screen for a message on the screen which includes the caller's name and account information. The agent is then able to answer the call with a greeting which includes, for example, the caller's name.

The system for an embodiment of the present invention displays information on the agent's terminal screen including, for example, the caller's account number and account balances, a summary of the caller's last six months' account activity, the caller's ending account balances for the month, and at least some of the caller's payment history. Different codes displayed on the agent's terminal screen also tell the agent, for example, how the customer obtains bills, and well as any collection status or other status information that might be associated with the caller.

A second aspect of an embodiment of the present invention provides the financial institution's business people additional information about callers and routes incoming calls, for example, directly to agents who are specially trained to handle particular types of customers. The system of the present invention divides callers by type, for example, into ten segments, such as transactors who pay up their bill every month, core revolvers who make a minimum monthly payment and carry a balance, and college students. Calls are routed by the system to agents who are specially trained to deal with the particular type of a customer.

In the second aspect of an embodiment of the present invention, the system uses five of the ten digits available for use in the ANI field. The system uses another one of the fields to identify into which group of callers a particular customer's account falls. The IVR gets the information from the host and manipulates one of the remaining five fields with a code which does something a little bit different than in the first aspect. This code is sent to the financial institution's network router. The network router reads the particular field and makes a routing decision based on what type of customer the caller is and what type of agent is available to service that type of customer. The system of the present invention likewise breaks up the agents into different servicing groups, and the particular field is used as a routing indicator rather than simply to provide a screen pop.

A third aspect of an embodiment of the present invention implements what is referred to as a leverage process. The leverage process involves introducing different products in the IVR to the caller and then asking the caller if she is interested in buying or signing up for a product. If the customer answers in the affirmative, the system builds into the same process used for the screen pop of the session ID an additional host process behind that process. The additional host process gives the agent the standard screen of information but with a special message referred to as an special account (S.A.) message, for example, at the bottom of the agent's terminal screen. The S.A. message says, for example, that this customer is particularly interested in buying or discussing some product or service offered by the financial institution.

A fourth aspect of an embodiment of the present invention involves the financial institution's needs based selling. The system takes the remaining digits that are left of the ANI field and uses those digits not only to tell the agent what type of customer the caller is, but also to tell what is referred to as the financial institution's network intelligent call router (NICR) what kinds of things that the customer might be interested in buying, if the customer knew about them. The calling customer does not know this is going on, but simply wants to talk to an agent. However, the system uses the remaining digits to route the caller to a sales specialist who can both service the caller and make a sale to the caller.

In an embodiment of the present invention, the ANI fields are use and reused and some are left unused. The system builds almost a permutation reusing different fields based on the 800 number that is dialing out. For example, a field on one 800 number means one thing, and the same field on a different 800 number means something different. The system also involves out dialing different 800 numbers for different reasons on the back end of the process. For example, in transferring a caller but in order to do a needs based sale to the caller, the caller is sent out a different 800 number. The ten digits has what is called a number plan area (NPA) field, which is the area code. The local exchange portion (NXX) uses the next three digits after the area code and then the extension is the last four digits. If the caller is transferred out on the needs based selling (NBS) 800 number, or what can be referred to as the NX of the NXX, those two digits indicate, for example, what type of an agent to connect to the caller to attempt to make a specialized sale. On a non-NBS call, in that same field, the N tells, for example, that the caller meets the default parameters of the application, and the first X tells, for example, into what segmented business unit (SBU) the caller falls.

A further aspect of an embodiment of the present invention involves a process in which the financial institution links its NIVR to its NICR platform. A large amount of data is sent to the NICR router that is basically held in a temporary storage on the router processor similar to the host processor. When a call comes into the router, the ANI field is looked at again, for example, the last five digits of the ANI field. That is used as a key to go into the router database and find, for example, up to 400 bits of data that is used to tell the router about the particular call. That opens up the ability of the financial institution from the prior limitation of ten digits to an unlimited amount of information that the financial institution can give about the caller, for example, to the financial institution's NICR and to the host.

For example, one embodiment of the present invention involves a call processing system that routes calls on a call by call basis. Instead of routing incoming calls on the basis of percent allocation of agents or of origination, this embodiment of the present invention uses rule sets to direct the routing of calls. This embodiment employs an NIVR, a network based automated voice response unit with host connect service. In this embodiment, rule set is utilized to handle calls going in to and out of the NIVR.

Another preferred embodiment of the present invention utilizes quota routing. This method can be used to off-load bursts of traffic, provide an outlet for an over-utilized agent split (high ASA), make use of other underutilized agents on a controlled basis, and provide a means for automatically managing an outsourcing contract.

In this embodiment of the invention, peg counters are placed in the rules so that the institution monitor the number of calls routed by the rules set, where the calls originated, and where the calls were directed. In an embodiment, there are two types of peg counters used, corporate and destination. The corporate peg counters are used at a global level. For instance, it can count how many calls were handled by a particular rules set. The destination peg counters are used at an agent pool level. For instance, it can count how many calls were given to or taken from another agent pool. Note that destination peg counters are across all destinations. For instance, if one had five destinations, a CALLS_GIVEN counter would be associated with each, so there would be five peg counters.

In one example, the following are the peg counters that can be used in the rules development. The 'C' or 'D' at the end of a peg counter name designates it as a corporate or destination peg counter. The 'F' or 'B' at the beginning of the peg counter name designates it as a front end (into the NIVR) or back end (out of the NIVR) NIVR call. Since destination peg counters are agent pool specific, it is not necessary to designate them front end or back end NIVR.

| Corporate Peg Counters | |
| --- | --- |
| F_TOTAL_CALLS_C | The number of front end NIVR calls handled by this rule |
| F_WEST_CALLS_C | The number of front end NIVR calls from the West |
| F_CENTRAL_CALLS_C | The number of front end NIVR calls from the Central region |

| Corporate Peg Counters -continued | |
| --- | --- |
| F_EAST_CALLS_C | The number of front end NIVR calls from the East |
| F_FRAUD_CALLS_C | The number of front end NIVR calls that failed the fraud city ANI test, bypassed the NIVR, and went directly to agents |
| B_TOTAL_CALLS_C | The number of calls handled by this rule |
| B_WEST_CALLS_C | The number of calls from the West |
| B_CENTRAL_CALLS_C | The number of calls from the Central region |
| B_EAST_CALLS_C | The number of calls from the East |

| Destination Peg Counters | |
| --- | --- |
| CALLS_GIVEN_D | The number of calls given up by an agent pool |
| CALLS TAKEN_D | The number of calls taken by an agent pool |
| FIRST_CHOICE_D | The number of calls that went to an agent pool as a First Choice |
| NIVR_CALLS_D | The number of calls that went to an NIVR node |
| NOT_FC_NIVR_CALLS_D | The number of calls that were not from a fraud city and went to an NIVR node |
| FRAUD_MATCH_D | The number of front end NIVR calls that passed the fraud ANI match condition |
| FRAUD_CALLS_TAKEN_D | The number of failed fraud calls taken by an agent pool |
| FRAUD_CALLS GIVEN_D | The number of failed fraud calls given by an agent pool |
| FRAUD_FIRST_CHOICE_D | The number of failed fraud calls that went to an agent pool as a First Choice |
| QUOTA_D | The total number of quota calls that went to an agent pool |
| QUOTA_GIVEN_D | The total number of quota calls given up by an agent pool and were quota routed to another pool |

In another embodiment of the invention, with regard to an NIVR, when a caller chooses to speak to an agent, the NIVR outdials either a match or a no match 800 number. This outdialing selection is based on whether the caller had a successful host session. If a match 800 number is outdialed, the ANI (NPA-NXX-XXXX) is replaced with NPA-551-xxxx, where xxxx is the session ID passed to the host by the NIVR. If a no match 800 number is outdialed, then the true caller's ANI is sent. The match and no match 800 numbers communicate the host whether the incoming caller has already entered their account number and, therefore, the host should look for that account number in its NIVR table for screen pop to the agent handling the call.

An example of a no match is when a call enters the NIVR and opts out immediately to an agent. The NIVR outdials the no match 800 number and places the true caller's ANI in the calling number field. The call reaches the Automated Call Director (ACD) and passes the no match Dialed Number Identification service (DNIS) and ANI onto the host. The host recognizes the DNIS as a no match DNIS and, therefore, attempts to perform an ANI lookup to obtain information on the incoming call. For example, the host could search for an account number associated with the ANI. If it finds such an associated account number, the host provides the account information by means of a screen pop as the call is sent to the agent.

An example of a match occurs when a call enters the NIVR, the caller enters his/her account number, listens to his/her account information and then opts out to an agent. The invention provides for the transmission of various information to the host after the caller enters their account number, including account number, ANI, and a four digit session ID. The NIVR then substitutes 551 for the NXX of the ANI and the session ID for the xxxx portion of the ANI (NPA-NXX-xxxx). The NIVR outdials the match 800 number, and places the new "manipulated ANI" in the calling number or ANI field. The call reaches the ACD and passes the match DNIS and the manipulated ANI onto the host. The host recognizes the DNIS as a match DNIS. It strips the last four digits off the manipulated ANI and performs a table look-up to find the associated account number. The host then provides the account information to the agent by means of a screen pop.

With the present invention, since each of three NIVR nodes are associated with a specific site and, therefore, hosts or terminal owning region, the session ID, account number, call, and host look-up relationship can be maintained. With the SCP, there is a possibility that, due to load balancing, a call will be directed to a site other than its NIVR associated site. When this occurs, the no match DNIS can be sent to the ACD. Thus, the host doesn't attempt an NIVR table look-up for the account number. In addition, were the host to do an ANI look-up for the account number, the information won't be found because the manipulated ANI will be the new (NPA-551-xxxx).

With this embodiment, there are several tables that can exist within the SCP. These include, in one preferred embodiment, Corp ID, 800 Number, Destination, Agent Split, Capacity, Rules Set, Peg Counts, and Quota Scheme. Multiple hierarchies can be established using the destination and agent split tables. These can be used for the purposes of contingencies or special routing.

The Corp ID Table contains the basic information about a customer or corporate unit. A Corp ID table entry points to the N00 numbers, destinations, agent splits, peg counters, and rules that it controls. The 800 Number Table contains one record for each N00 number in the system. The table also identifies the Corp ID that owns the number and the main routing characteristics associated with the number. The Destination Table contains one record for each Destination Identifier in the system. Each record associates a destination with its owner's Corp ID and the basic call handling characteristics to be used when selecting that Destination Identifier. A destination can be assigned to an Agent split. An Agent split is a grouping of Destination Identifiers representing a set of terminations at a particular ACD. The Agent split Table contains one record for each Agent split Identifier in the system. Each record associates a Destination Identifier with an Agent split, and specifies the method to be used for selecting a particular Destination Identifier from an Agent split. A Capacity Table may be associated with a particular Destination Identifier or Agent split. When a capacity table is defined for a Destination Identifier or Agent split, it contains highly detailed information about the staffing level at that destination for each hour of the normal day. It also contains information for unusual conditions or holiday situations. If a capacity table exists, its information is used to make routing selection more precise. If ACD feeds are available, then the ACD statistics override the Capacity Table data. This is only the case where capacity data is greater than zero. If the capacity table shows a value of zero, than the SCP considers the Agent split closed even if there are agents logged on. It is this zero capacity feature that is used to close a site at the end of that day. It allows agents to be logged on to handle any in progress calls or calls in queue and not have the SCP route calms to that Agent split. If this were not the case, the agents would never be allowed to log off because the SCP would continue to send the Agent split calls because it would continue to have capacity (agents). The Rules Set Table contains the named Rules Sets that are owned by each Corp ID. Rules Sets are pointed to by N00 Number Table entries. When a call is placed to an N00 Number, the Rules Set associated with that N00 number is invoked. Rules Sets use the information in the destination tables, capacity tables, Peg Counts tables, and optional quota scheme tables during call routing. The Quota Scheme Table is an optional table providing minimum, maximum, and target call volumes for a destination based on a particular day of the week or date. If a quota scheme is associated with a destination in a Rules Set, the Rules Set uses the quota information as part of its load balancing algorithm.

ANI lists contain entries that represent all or part of a telephone number. These number sequences are used to analyze or categorize the telephone number of the person originating the 800 call. These lists can be manipulated manually through the workstation, through bulk data downloads, or special Rules verbs that operate on dynamic lists. Currently there are several ways to maintain the ANI lists used in the rule sets. These are (1) manual, in which ANI lists can be accessed and updated through the SCP workstation; (2) workstation download, in which ANI lists are downloaded through any of the SCP workstations; (3) tape download, in which DAT tapes containing ANI lists can be provided for download to the SCP the following day; (4) disk download, in which DOS formatted disks containing ANI lists can be provided for download to the SCP the following day; and (5) dynamically, in which rule sets can add or delete the caller's ANI dynamically to or from a list or empty a list of all ANIs. When downloading ANI lists, there are three different methods of modifying ANI records. These are replacing the entire list, deleting records within a list, and adding records to a list. Deleting and then adding a record with the new information to a list is the same as changing a record.

In one version of the invention, rules can be written that reference the site such that calls are evenly load-balanced between more than one ACD and more than one trunk group. Rules can also be written that only reference the ACD (agent split). In addition, multiple site hierarchies can be set up to only reference a portion of the tree. Destinations can be defined at the trunk group, ACD, or site level. One parameter driving the level of definition is the desired level of granularity of routing that the user wants to implement. For instance, for normal routing, the user may want to define destinations at the site level.

In a version of the invention, the load modifier provides a bias or skewing factor to be applied to a destination (trunk group) or agent split when the routing algorithm is selecting a destination or agent split. A value of less than 100 reduces the apparent call handling capacity by the specified amount. For example, a load modifier of 80% means that the routing algorithm treats this location as though it had only 80% of its stated capacity. A value of greater than 100 increases the apparent call handling capacity by the specified amount. Preferably, the minimum value is zero and the maximum value is 999%. The destination or trunk group load modifier reduces the amount of traffic sent to that trunk group but does not affect the amount of traffic going to the Agent split associated with that trunk group. Traffic taken away from one trunk group is re-distributed to the other trunk groups associated with the same Agent split. The agent split load modifier reduces the amount of traffic routed to that split.

Traffic reduced at one split is redistributed among the other splits, if applicable.

In this embodiment of the present invention, the steps in creating a rule are, preferably, (1) establish the policy under which calls will be routed; (2) create the rule using action only and/or If/Then/Else statements; (3) verify the rule by applying a simulated phone call and stepping through the logic; (4) validate the rule for correct syntax; and (5) install the rule so that it can be available for implementation.

In one example, policies and example rules can support the normal routing of calls under the SCP. Normal routing can also include the screening of calls before going to NIVR, special handling for abusive callers, and quota routing. For example, one example is normal routing, where the policy is to maintain geographic based routing and load balance calls when there is a difference of delay between sites of more than a selected number of seconds.

An example of a normal rule without peg counts is as follows:

Allow Only NV MN or SD_MN or MD_MN
If ANI is West then First Choice includes NV MN
If ANI is Central then First Choice includes SD-MN
If ANI is East then First Choice includes MD MN
Prefer First Choice by 20 Seconds An example of a normal rule with peg counts is as follows.

Allow Only NV MN or SD_MN or MD MN
Increment B_TOTAL_CALLS_C
If ANI is West then
First Choice includes NV_MN and Increment B_WEST_CALLS_C
If ANI is Central then First Choice includes SD_MN and Increment B_CENTRAL_CALLS_C
If ANI is East then
First Choice includes MD_MN and Increment B_EAST_CALLS_C
If Advantage of Others over First Choice is greater than 20 seconds then
Allow Only Others and
Increment CALLS_TAKEN_D for Selected and
Increment CALLS_GIVEN_D for First Choice else
Allow Only First Choice and increment FIRST_CHOICE_D for selected In addition, in other embodiment, the system provides for fraud screening. Here, in addition to the geographic with load balancing policy, the SCP is used to screen fraudulent calls before they go to the NIVR. This screening would be done on the front end of the NIVR. An example rule of the SCP Fraud screening without peg counts follows. Calls coming into the NIVR are first screened by the rule set in the SCP. If the call is coming from a fraudulent number, the SCP checks to see if the ANI matches existing customer's home and office ANI's. If there is not a match, the call is sent directly to an agent, bypassing the NIVR. If there is a match, the call is sent onto the NIVR. This reduces the number of calls to the NIVR that would otherwise be kicked out anyway due to ANI mismatch.

Allow only NV_MN or SD_MN or MD_MN or NIVRSAC or NIVRATU or NIVRWOR
If ANI is West then First Choice includes NV_MN and Second Choice includes NIVRSAC
If ANI is Central then First Choice includes SD-MN and Second Choice includes NIVRATU
If ANI is East then First Choice includes MD_MN and Second Choice includes NIVRWOR
If ANI is Fraud City and ANI is not Match then eliminate NIVRWOR and NIVRATU and NIVRSAC and prefer First Choice by 20 seconds
Else allow only Second Choice An example rule of the SCP Fraud screening with peg counts is also provided.

Allow only NV_MN or SD_MN or MD_MN or NIVRSAC or NIVRATU or NIVRWOR
Increment F_TOTAL_CALLS_C
If ANI is West then First Choice includes NV_MN and Second Choice includes NIVRSAC and Increment F_WEST_CALLS_C
If ANI is Central then First Choice includes SD_MN and Second Choice includes NIVRATU and Increment F_CENTRAL_CALLS_C
If ANI is East then First Choice includes MD_MN and Second Choice includes NIVRWOR and Increment F_EAST_CALLS_C
IF ANI is not FRAUD-CITY then Allow only Second Choice and Increment NIVR_CALLS_D for selected and Increment NOT_FC_NIVR_CALLS_D for selected and Exit
If ANI is FC_ANI_MATCH then Allow only Second Choice and Increment NIVR_CALLS D for selected and Increment F_FRAUD_MATCH_D for selected and Exit
Eliminate NIVRWOR and NIVRATU and NIVRSAC
Increment F_FRAUD_CALLS_C
If Advantage of Others over First Choice is greater than 20 seconds then Allow only others and Increment FRAUD_CALLS_TAKEN_D for Selected and
Increment FRAUD CALLS_GIVEN_D for First Choice else
Allow Only First Choice and Increment FRAUD_FIRST CHOICE_D To support normal evening closings of MD_MN and NV and provide screen pop for all calls going to SD, the above rule could be changed as follows. In order to support this rule, the capacity tables for NIVR would have to be set up in accordance with the time when the relative sites close. This is because there are no ACD feeds from the NIVR nodes.

Allow only NV_MN or SD_MN or MD MN or NIVRSAC or NIVRATU or NIVRWOR
If ANI is West then First choice includes NV_MN and Second Choice includes NIVRSAC
If ANI is Central then First Choice includes SD_MN and Second Choice includes NIVRATU
If ANI is East then First Choice includes MD_MN and Second Choice includes NIVRWOR
If ANI is Fraud and ANI is not Match then eliminate NIVRWOR and NIVRATU and NIVRSAC and prefer- First Choice by 20 seconds and Exit
If Staff at Second Choice is not 0 then allow only Second Choice
Else allow only NIVRATU The following is an example rule of the SCP Fraud screening with SD_MN staying open 24×7 and MD MN and NV MN closing at different times.

Allow only NV_MN or SD_MN or MD_MN or
  NIVRSAC or NIVRATU or NIVRWOR Increment
  F_TOTAL_CALLS_C
If ANI is West then First Choice includes NV_MN and
  Second Choice includes NIVRSAC and Increment
  F_WEST_CALLS_C
If ANI is Central then First Choice includes SD_MN and
  Second Choice includes NIVRATU and Increment
  F_CENTRAL_CALLS_C
If ANI is East then First Choice includes MD_MN and
  Second Choice includes NIVRWOR and Increment
  F_EAST_CALLS_C
IF ANI is not FRAUD and Staff at Second Choice is not 0
  then Allow only Second Choice and Increment NIVR_
  CALLS_D for selected and Increment NOT_FC_
  NIVR_CALLS_D for selected and Exit
IF ANI is not FRAUD CITY and Staff at Second Choice is
  0 then Allow only NIVRATU and Increment NIVR_
  CALLS_D for selected and Increment NOT_FC_
  NIVR_CALLS_D for selected and Exit
If ANI is FC_ANI_MATCH and Staff at Second Choice is
  not 0 then Allow only Second Choice and Increment
  NIVR_CALLS_D for selected and Increment
  F_FRAUD_MATCH_D for selected and Exit
If ANI is FC_ANI_MATCH and Staff at Second Choice is
  0 then Allow only NIVRATU and Increment NIVR_
  CALLS_D for selected and Increment F_FRAUD_
  MATCH_D for selected and Exit Eliminate NIVRWOR
  and NIVRATU and NIVRSAC Increment F_FRAUD_
  CALLS_C
If Advantage of Others over First Choice is greater than 20
  seconds then Allow Only Others and Increment
  FRAUD_CALLS_TAKEN_D for Selected and Incre-
  ment FRAUD_CALLS_GIVEN_D for First Choice
  else Allow Only First Choice and Increment FRAUD_
  FIRST_CHOICE_D In another embodiment of the invention, the system provides for abusive caller screening. One can create an ANI list that routes abusive callers to either a special agent split, an NIVR message, a switch message (e.g., not authorized to dial this number), or a network busy. An example rule for providing abusive caller screening follows. In this example, the call is routed to an NIVR message and a peg count is incremented that keeps track of when the caller called.

Allow Only NV_MN or SD_MN or MD_MN or
  NIVRAbusive
If ANI is West then First Choice includes NV_MN
If ANI is Central then First Choice includes SD_MN
If ANI is East then First Choice includes MD_MN
Prefer First Choice by 20 Seconds
If ANI is Abusive then allow only NIVRAbusive and
  Increment ABUSE_JOHN_DOE In some instances it may be necessary to outsource calls or to off load them to another business site. An example follows.

Allow only NV_MN or SD_MN or MD_MN or RI or KC
Assign RI Quota to RI
Assign KC Quota to KC
If ANI is West then First Choice includes NV_MN and
  Second Choice includes RI and KC
If ANI is Central then First Choice includes SD_MN and
  Second Choice includes RI and KC
If ANI is East then First Choice includes MD_MN and
  Second Choice includes RI and KC
If Delay at First Choice is <50 seconds then Eliminate RI
  and KC and Prefer First Choice by 20 seconds and
Exit if Quota at Second Choice is behind target then Allow
  only Second Choice
Else Eliminate RI and KC and prefer First Choice by 20
  seconds The following is a quota routing example with peg counts. QUOTA_D keeps track of how many calls were sent to the overflow site.

Allow only NV_MN or SD_MN or MD_MN or RI or KC
Assign RI Quota to RI
Assign KC Quota to KC
Increment B_TOTAL_CALLS_C
If ANI is West then First Choice includes NV_MN and
  Second Choice includes RI and KC and Increment
  B_WEST_CALLS_C
If ANI is Central then First Choice includes SD_MN and
  Second Choice includes RI and KC and Increment
  B_CENTRAL_CALLS_C
If ANI is East then First Choice includes MD_MN and
  Second Choice includes RI and KC and Increment
  BEAST_CALLS_C
If Delay at First Choice is <50 seconds
  and Advantage of others over First Choice is less/equal to 20
  seconds then Allow Only First Choice and Increment
  FIRST_CHOICE_D and Eliminate RI and KC and Exit
If Delay at First Choice is <50 seconds and Advantage of
  others over First Choice is greater than 20 seconds then
  Allow Only Others and Eliminate RI and KC and Incre-
  ment CALLS_TAKEN_D for Selected and Increment
  CALLS GIVEN D for First Choice and Exit
If Quota at Second Choice is behind target then Allow only
  Second Choice and Increment QUOTA-D for Selected
  and Increment QUOTA_GIVEN D for First Choice and
  Exit
If Quota at Second Choice is at or ahead of target then
  Eliminate RI and KC
If Advantage of Others over First Choice is less/equal to 20
  seconds then Allow Only First Choice and Increment
  FIRST_CHOICE_D and Exit
If Advantage of Others over First choice is greater than 20
  seconds then Allow only Others and Eliminate RI and KC
  and Increment CALLS_TAKEN_D for Selected and
  Increment CALLS_GIVEN_D for First Choice and Exit In another version of the present invention, the system provides various contingencies developed to handle anomalous events and network and site based troubles and failures. There are, preferably, two contingency categories: agent and network related. Agent related contingencies include weather (reduced agents and site closing), absenteeism, training, and Call Capacity/ASA. All of these contingencies relate to the ability of a site to handle calls or capacity. Capacity relates to the number of agents, calls in queue, average call handle time, calls in queue, ASA, and other factors. The SCP formulates a model that is based on capacity. It represents the average time it will take to answer a call. This is also referred to as delay. Delay is similar to ASA but is a better representation of a sites ability to answer a since it takes all of these factors into consideration. Agent related contingencies are adjusted for automatically by the SCP. This includes when a split opens and closes. The SCP will monitor the number of agents and delay for a split and will adjust the routing of calls appropriately.

Network related contingencies include Center Closing (Manual/Automatic), Trunk Outage (Manual), ACD Outage (Manual), and CMS Outage (Manual/Automatic). In the case of center closing, trunk outage, or ACD outage, destination and agent split load modifiers will be used to route traffic around the fault. In the case of a CMS feed outage, the SCP can still route calls based on incoming calls and pre-defined agent tables.

If the ACD and CMS fail, destination and/or agent split load modifiers will be used to close the affected location down. The reason that load modifiers are used instead of Rule Sets is that the load modifiers are global instead of application or 800 number based. When changing a load modifier, it affects all Rule Sets that reference that agent split or destination. Since the load modifiers are, preferably, on a destination and agent split basis, separate procedures will need to be put in place for each of the ACDs at a site. A failure situation for ACD only failure is not provided because it is the same scenario as the ACD and CMS Failure. This reason being, if the ACD fails, the CMS will not provide an update to the SCP to reflect that the ACD has failed.

If the ACD is up and the CMS feed has failed, maintain SCP routing for a period of time and then revert to pure geographic routing. During the period the SCP geographic/load balancing rule is in place, load modifiers can be used to skew traffic. These load modifiers will be changed based on test calls to the agent splits. An example of a CMS failure rule is as follows (pure geographic). This rule will be used as a final contingency, after the use of load modifiers.

Allow Only NV_MN or SD_MN or MD NIT
If ANI is East then First Choice includes MD_MN
If ANI is Central then First Choice includes SD_MN
If ANI is West then First Choice includes NV_MN If there is a trunk group failure, then the system provides for the removal of the failed trunk group from routing selection and reduces the volume of calls directed to the site on a situational basis (e.g., peak hour). This can include reducing the number of calls to a trunk group and/or split. Contingency plans for trunk group failures can include only the adjustment of the load modifiers for the trunk group and agent split. Removal of the TG from the routing selection can be done two ways: (1) total failure—changes the load modifier for the TG from 100% to 0% and (2) partial failure—removes the TG as in a total failure, or reduce the amount of traffic by lowering the load modifier based on the number of failed circuits. Since there are fewer trunks available but the same number of agents, it may appear that the split is performing better. This could be caused by calls being blocked because all the trunks are busy and are therefore not reaching agents. In this case, the agent split load modifier would have to be adjusted to prevent overloading the remaining trunk group.

If an NIVR node fails, the system provides for even distribution of traffic across the remaining nodes. If it is a partial node failure, reduce amount of traffic to affected trunk group or entire node. For total failure, the system implements a Rule Set that removes the NIVR node from the routing scheme and evenly distributes the node's traffic across the remaining nodes. For partial failure, the system provides that, if the failure is a trunk group failure, use the load modifier to prevent calls from routing to that trunk group. If the failure occurs during the busy portion of the day, it needs to be determined if the additional load can be carried by the other trunk group. If not, a rule set will be implemented that off loads a percentage of traffic to the other NIVR nodes.

An example of a total NIVR node (NIVRWOR) failure rule follows. It takes the traffic going to the West Orange NIVR node and distributes it evenly across the Sacramento and Atlanta nodes.

Allow only NV_MN or SD_MN or MD_MN or NIVRSAC or NIVRATU
If ANI is West then First Choice includes NV_MN and Second Choice is by Percentage NIVRSAC 50%, NIVRATU 50%
If ANI is Central then First Choice includes SD_MN and Second Choice includes NIVRATU
If ANI is East then First Choice includes MD_MN and Second Choice includes NIVRSAC
If ANI is Fraud City and ANI is not Match then eliminate NIVRWOR and NIVRATU and NIVRSAC and prefer First Choice by 20 seconds
Else allow only Second Choice
If Staff at Second Choice is not 0 then allow only Second Choice
Else allow only NIVRATU An example of a partial NIVR node (NIVRWOR) failure rule follows. It takes some of the traffic going to one NIVR node and distributes it evenly across two other nodes. In addition to this rule, the destination load modifier may be used to prevent traffic going over the affected trunk group.

Allow only NV_MN or SD_MN or MD_MN or NIVRSAC or NIVRATU or NIVRWOR
If ANI is West then First Choice includes NV_MN and Second Choice is by Percentage NIVRSAC 25%, NIVRATU 25%, NIVRWOR 50%
If ANI is Central then First Choice includes SD_MN and Second Choice includes NIVRATU
If ANI is East then First Choice includes MD_MN and Second Choice includes NIVRSAC
If ANI is Fraud city and ANI is not Match then eliminate NIVRWOR and NIVRATU and NIVRSAC and prefer First Choice by 20 seconds
Else allow only Second Choice
If Staff at Second Choice is not 0 then allow only Second Choice
Else allow only NIVRATU For incoming NIVR calls, various site openings and closings can be supported. The SCP will detect a site opening or closing through the site staff information. The site staff or capacity table is used, instead of the NIVR Table so that only one set of tables need be maintained. Allow only NV_MN or SD_MN or MD_MN or NIVRSAC or NIVRATU or NIVRWOR Increment F_TOTAL_CALLS_C If ANI is West then First Choice includes NV_MN and Second Choice includes NIVRSAC and Increment F_WEST_CALLS_C
If ANI is Central then First Choice includes SD_MN and Second Choice includes NIVRATU and Increment F_CENTRAL CALLS_C
If ANI is East then First Choice includes MD_MN and Second Choice includes NIVRWOR and Increment F_EAST_CALLS_C
IF ANI is not FRAUD and Staff at First Choice is not 0 then Allow only Second Choice and Increment NIVR_CALLS_D for selected and Increment NOT_FC_NIVR_CALLS_D for selected and Exit If ANI is not FRAUD and Staff at First Choice is less than or equal to 0 then Allow only NIVRATU and Increment NIVR_CALLS_D for selected and Increment NOT_FC_NIVR_CALLS_D for selected and Exit If ANI is FC_ANI_MATCH and Staff at First Choice is not 0 then Allow only Second Choice and Increment NIVR_CALLS_D for selected and Increment F_FRAUD_MATCH_D for selected and Exit If ANI is FC_ANI_MATCH and Staff at First Choice is less than or equal to 0 then Allow only NIVRATU and Increment NIVR_CALLS_D for selected and Increment F_FRAUD_MATCH_D for selected and Exit Eliminate NIVRWOR and NIVRATU and NIVRSAC Increment F_FRAUD_CALLS_C If Advantage of Others over First Choice is greater than 20 seconds then Allow Only Others and Increment FRAUD_CALLS_TAKEN_D for Selected and Increment FRAUD_CALLS_GIVEN_D for First Choice else Allow Only First Choice and Increment FRAUD_FIRST CHOICE_D In a preferred embodiment, only those calls that do not enter into a valid session with the host to retrieve account information will be load balanced. Those calls that do enter into valid host sessions will be routed based on call origination. This can maintain screen pop capabilities. This separation of host session (match) and no host session (no match) is maintained through separate outgoing 800 number from the NIVR. For outgoing NIVR matched calls, these calls are not load balanced.

Allow Only NV_MN or SD_MN or MD_MN
Increment B_TOTAL_CALLS_C
If ANI is West then First Choice includes NV_MN and Increment B_WEST_CALLS_C
If ANI is Central then First Choice includes SD-MN and Increment B_CENTRAL_CALLS_C
If ANI is East then First Choice includes MD MN and Increment B_EAST_CALLS_C
If Staff at First Choice is less than or equal to 0 then
Allow only Others and
Exit Allow Only First Choice and increment FIRST CHOICE D for selected For outgoing NIVR no match calls, these calls are load balanced across all sites. Special rules to handle the sites opening and closing are not required because this is automatically accomplished through the staff or capacity tables. If a site is close (Staff=0), then calls will be automatically balanced across the remaining open sites.

Allow Only NV_MN or SD_MN or MD_MN
Increment B_TOTAL_CALLS_C
If ANI is West then First choice includes NV_MN and Increment B_WEST_CALLS_C
If ANI is Central then First Choice includes SD_MN and Increment B_CENTRAL_CALLS_C
If ANI is East then First Choice includes MD_MN and Increment B_EAST_CALLS_C
If Advantage of Others over First Choice is greater than 20 seconds then
Allow Only Others and
Increment CALLS TAKEN D for Selected and
Increment CALLS_GIVEN_D for First Choice
Else Allow Only First Choice and increment FIRST CHOICE D for selected In one particularly preferred embodiment of the present invention, there are changes in the NIVR/Host and Host/NIVR message streams relative to a conventional call processing system. For example, for the ANI Match Message Format, the message stream that is transmitted from the NIVR to the Host when there is a Segmentation ANI Match request from the NIVR is as follows:

| FILLER | PIC X(10) | VOIN ##### |
|---|---|---|
| ACCOUNT | PIC X(16) | Account number |
| FILLER | PIC X(1) | |
| SESSION ID | PIC X(7) | |
| ANI | PIC X(10) | Automatic Number Identifier |
| CALL TYPE | PIC X(1) | C = Customer Service |
| | | N = NRI Block Inquiry |
| | | R = NRI Block Removal |
| | | P = Pin Over the Phone (P.O.P) |
| | | S = Segment request based on ANI |
| ACTION | PIC X(1) | Action (P.O.P. only) |
| FAILS | PIC X(1) | # of failures (P.O.P. only) |
| NEW PIN | PIC X(4) | New Pin (P.O.P. only) |

This messaging is separate from the Account Match messaging. This message stream is only sent when the NIVR sends a Segmentation NIVR Match request. In other words, the "S" CALL TYPE message stream is only used when there is not a successful Account Match.

The only Host to NIVR message stream response allowed to the "S" CALL TYPE message stream is the Segmentation Host to NIVR ANI Match message stream.

With regard to the format for the ANI Match Host to NIVR message stream format, the following message stream can be sent for all ANI Match (CALL TYPE "S") requests.

ANI Match Host to NIVR

| Field | # bytes | Format | Data |
|---|---|---|---|
| TRAN NAME | 5 | char | VN 01 |
| RETURN CODE | 1 | num | |
| ANI | 10 | num | |
| SBU | 3 | num | |
| ACCOUNT STATUS | 2 | num | |

If an ANI Match is not successful in the host, the following host message will be sent to NIVR. This is the same condition with an Account Match error.

| Field | # bytes | Format | Data | Fin file field |
|---|---|---|---|---|
| Filler | 5 | char | VN OI | |
| Return Code | 1 | num | 1 | |

When this message is received by the NIVR, the call will be handled as a default segment (e.g., unknown). This will be the same for Account Match and ANI Match transactions.

The present invention also provides for Segmentation Account Match message streams that are passed between the NIVR and the host. The NIVR to Host messaging does not change since CALL TYPE "S" is not used for Account Match requests. Those applications that use CALL TYPES C, N, R, and P will continue to pass their messages to the Host as they do today. The Host to NIVR messaging does change. We will be adding an additional 81 bytes to the existing application's message stream. The following are the new fields that will be appended to the existing application's message stream. The only applicable field for this phase is the "SBU" or segment field. All other additional fields can be ignored at this time. Account Match NIVR/Host Appended Information Message Format

| Field | # bytes | Format | Data | Fin file field |
|---|---|---|---|---|
| SBU | 3 | num | 999 | FIN_SBU |
| RANDOM DIGIT | 3 | num | 999 | FIN_RANDOM_DIG |
| DIRECT DEBIT INDICATOR | 1 | char | X | FIN_DIR_DB-INDICATOR |
| BAL CON FLAG | 1 | char | X | FIN_BAL_CON_FLAG |
| BAL CON EXPIR DATE | 8 | char | MMDD YYYY | FIN-BALCON_EXP_DATE |
| BAL CON OFFER TYPE | 1 | char | X | FIN_BALCON_OFFER |
| BAL CON RATE | 6 | num | 999.99 | FIN_BALCON_RATE |
| DELINQ BUCKET 12 | 1 | char | X | FIN_LOLL_HISTORY(12) |
| DELINQ BUCKET 11 | 1 | char | X | FIN_COLL_HISTORY(11) |
| DELINQ BUCKET 10 | 1 | char | X | FIN-LOLL-HISTORY(10) |
| BEST CUSTOMER TAG | 1 | num | 9 | FIN-ACT-BEST-CUST |
| DATE LAST CL CHANGE | 3 | num | 999 | FIN-DAYS-LAST-CRLIM-CHANGE |
| CL CHANGE IND | 1 | char | X | FIN-CLI-ORIGIN-CODE |
| CITIONE INDICATOR | 1 | char | X | FIN-CITIONE-IND |
| HOT CARD INDICATOR | 1 | char | X | FIN-HOT-CARD |
| CREDIT SHIELD INDICATOR | 2 | char | XX | FIN-INS-CLM-STAT |
| BILLED BALANCE | 11 | num | 999999 9.99(-) | FIN-PREV-BAL |
| MONTHS ON BOOKS | 3 | num | 999 | FIN-MONTHS-ON-BOOKS |
| AMF INDICATOR | 1 | char | X | FIN-ACCT-MONITORING-CODE |
| DAYS SINCE LAST BAD CHECK | 3 | num | 999 | FIN-DAYS-LAST-BAD-CHECK |
| M SCORE | 99.9 | 4 | num | FIN-M-SCORE |
| DAYS SINCE NAME/ADD CHNG | 3 | num | 999 | FIN-DAYS-LAST-NA-CHANGE |
| LIFETIME PAYMENT RATIO | 5 | num | 9.999 | |
| PRODUCT ID | 3 | num | 999 | FIN-ACT-PRODUCT-ID |
| SPID | 3 | num | 999 | FIN-CPT-KEY |
| CURRENT DELINQ BUCK | 1 | num | 9 | FIN-DEL-BUCKET-OCCURS |
| T SCORE | 5 | num | 99.9(-) | FIN-T-SCORE |
| MDS SCORE | 4 | num | 999(-) | FIN-MDS-SCORE |

Notes:
The Data fields with a (-) reflect a trailing field that is either negative (marked with a -) or positive (a blank field).

In addition, the present invention provides for Account Match and ANI Match Requests.

This section outlines for which agent transfers, the ANI Match request is initiated for the various affected applications. It also addresses how call are routed on the back end of NIVR after an Account or ANI Match request is performed and the call is sent on to the call center.

After the request to transfer occurs, the NIVR sends the ANI Match request to the host first and then NIVR plays the appropriate message while waiting for a response from the host. This is only for ANI Match requests, Account Match requests perform as they do today.

There will be a new outbound NIVR 800 number for segmented ANI Match calls. This will be used for ANI Match requests that return an active segment. See following tables for when this 800 number is utilized.

If the ANI that is received is less than 10 digits, an ANI Match request is sent with the missing digits being padded with 9's.

In another embodiment of the invention, in certain circumstances, the customer is either disconnected or is transferred to an agent. An exemplary set of conditions are, as follows:

Account Closed—No Impact, plays message and then disconnects call
Bankrupt Tran—No Impact, plays message and then disconnects call
Bucket 1—No Impact, routing remains the same as today
Bucket 2—No Impact, routing remains the same as today
Bucket 3—No Impact, routing remains the same as today
Bucket 4—No Impact, routing remains the same as today
Bucket 5—No Impact, routing remains the same as today
DOB Fail—ANI Match request
No Card # Pref—Not Used Anymore?
Prompt Fail—ANI Match request
Social Fail—ANI Match request
Speak No Card—ANI Match request
Tran—No Impact, Account Match based transfer, segment known
Trans Rotary—ANI Match request
Verify Fail—ANI Match request The following table outlines for which situations the specific NIVR outbound 800 numbers and ANI manipulation are used.

| Match Type | Active Segment | 800 Number | ANI Altered | True ANI |
|---|---|---|---|---|
| Account Match | Yes | BankCards Customer Service Account Match | Yes | No |
| Account Match | No | BankCards Customer Service Account No Match | No | Yes |
| Account Match | Default/ Unknown | BankCards Customer Service Account No Match | No | Yes |
| ANI Match | Yes | BankCards Customer Service ANI Match | Yes | No |
| ANI Match | No | BankCards Customer Service Account No Match | No | Yes |
| ANI Match | Default/ Unknown | BankCards Customer Service Account No Match | No | Yes |

The following lists where in the BankCards NRI NIVR application the customer is either disconnected or is transferred to an agent.

Account Closed—No Impact, plays message and then disconnects call
Bankrupt Tran—No Impact, plays message and then disconnects call
Bucket 1—No Impact, routing remains the same as today
Bucket 2—No Impact, routing remains the same as today
Bucket 3—No Impact, routing remains the same as today
Bucket 9—No Impact, routing remains the same as today
Bucket 5—No Impact, routing remains the same as today
Error W Call—ANI Match request
DOB Fail—ANI Match request
Prompt Fail—ANI Match request
Social Fail—ANI Match request
Speak No Card—ANI Match request
Tran—No Impact, Account Match based transfer, segment known
Trans Rotary—ANI Match request
Verify Fail—ANI Match request The following table outlines for which situations the specific NIVR outbound 800 numbers and ANI manipulation are used. Note that NRI active segment calls (Account and ANI Match; are routed to the BankCards Customer Service 800 numbers.

| Match Type | Active Segment | 800 Number | ANI Altered | True ANI |
| --- | --- | --- | --- | --- |
| Account Match | Yes | BankCards Customer Service Account Match | Yes | No |
| Account Match | No | BankCards Customer Service Account No Match | No | Yes |
| Account Match | Default/ Unknown | BankCards Customer Service Account No Match | No | Yes |
| ANI Match | Yes | BankCards Customer Service ANI Match | Yes | No |
| ANI Match | No | BankCards Customer Service Account No Match | No | Yes |
| ANI Match | Default/ Unknown | BankCards Customer Service Account No Match | No | Yes |

In another embodiment of the present invention, the institution will alter the ANI in response to a BankCard PIN provided over the telephone. In such circumstances, Initial "0" Transfer—ANI Match request
Initial "1" Transfer—No Impact, Account Match based transfer, segment known
Invalid Account—ANI Match request
PIN Fail—ANI Match request
Success PIN—No Impact, Account Match based transfer, segment known
Agent Transfer after successful PIN (?)—No Impact, Account Match transfer In another aspect of the invention, calls to the calling center will be segmented calls when a customer chooses to speak with an agent. Thus, the ANI Match process is employed between the NIVR and the host, rather that between the ACD and the host.

This manipulation of the ANI is used to convey the segment to the Network Intelligent Call Router (NICR). Only the highest order digit (100's place) will be used for routing of segmented calls. This means that subsegment information will have no impact on call routing decisions. NICR will use this information to route the call to the appropriate segment. The following is the new ANI structure to support segmentation. The NIVR node and session ID are already used with the NIVR application.

xxx-xxx-xxxx
III I
111 Session ID (4 digits)
IINIVR node (1 digit)

Segment (1 digit, 0–9)

Default

If the segment is unknown, the host/link is down, an ANI Match was unsuccessful, an Account Match was unsuccessful, the segment is not active at this time, or if the SBU is 001, the default value will be used. The following is the ANI structure for the default value.

xxx-90x-xxxx

Session IDs are used to coordinate the call arriving at the Customer Service center and the session established with the TOR when the customer enters his/her account number. In other words, session IDs make possible "screen pop" when the IVR is network based. Each NIVR node has its own unique series of session IDs to support the load balancing of calls across multiple sites.

The VRU leveraging process will allow the business to target customer-specific messages based on SBU and criteria-driven offers. The Customer Service NIVR application to offer revenue-generating options via the VRU through targeted messaging; i.e., credit line increases, balance transfers, additional plastic offers, conversion and upgrades, among others. In addition to the offers, customers will be recognized for recent credit line increases granted based on their credit behavior. Customers will also be given an opportunity to broaden their relationship through direct contact with the retail business (i.e., branch locations).

Currently the Cards Products NIVR application platform provide customer access to account balance, credit and payment information. Customers are identified in the application by entering a valid account number and PIN. The application provides screen POP information on all account and ANI match call transfer requests.

An embodiment of the present invention provides that the NIVR application will allow customers to be informed of upgrades to their accounts or of various offers that are available to them. The NICR process uses routing to business units, based on using several 'unused' digits in the manipulated ANI. The Leveraging project will provide specialized messaging (if a customer accepts an offer) based on a new process where the NIVR notifies the host. The host, in turn will stage an appropriate set of terminal messages. These messages will be sent to the terminal when the appropriate Session ID is received at -the ACD.

The host sends information to the NIVR application directing the NIVR to play one of various product/ percentage specific scripts to the customer. The NIVR application will in turn inform the host (via modified host messaging format) of the following: (1) the customer declined the offer, (2) the customer hangs up before the offer was made, or NIVR overrode the offer, (3) the customer elected to take advantage of the offer, or (4) the host was able to successfully complete a database update.

Another aspect of the invention is a process is centered on routing calls to especially trained agent sales groups that have shown an aptitude in selling various services; such as Insurance and Balance Consolidations, and revenue products.

The customers will be scored by the product (in the host) they are eligible for with a high, medium and low profitability/probability of offer acceptance code. The 'Product(s) code' and 'Sale Score' will be passed to the NIVR with other host information associated with the account. This information is in turn passed to the NICR to support call routing.

The Network Intelligent Call Routing (NICR) system routes these referred calls to various sales groups based on the customer's Product/Sale score. Calls will be sent to split/skills manned by agents trained to handle the specific type of call they will receive. Each sales group will be broken down into two additional groups based on product understanding and sales aptitude.

The goal is to match the referring customer to an available agent that can sell the service or product the customer is most likely to purchase. The agents in these groups will be compensated for each sale that is completed.

The process operates as follows. The host evaluates each account (being accessed through the NIVR system) to determine if it is eligible for a wide range of available products and services. The host will also access each offer available for profitability and probability of customer offer acceptance. The host will then rank the top five offers to be sent to the IVR. This product ranking information will be added to the NIVR message set. The NIVR will receive the additional information from the host. This information will be used to determine routing prior to processing the caller's information request.

Based on the host codes, the NIVR may provide differing call flows or events. There may be no apparent difference in the call flow to the customer, or he/she may hear product offers. On one instance, the caller may not perceive any change in the application call flow. However, if he/she initiates an agent referral (or application defaults) the NIVR will transfer the call via the network to a call center for agent service and sales opportunity. The caller may hear NBS offer information in the application call flow. If he/she initiates an agent referral (or application defaults) the NIVR will transfer the call via the network to a call center for agent service and-sales opportunity. The NIVR may immediately send the call via the network to a call center for agent service and sales opportunity. The caller may remain in the NIVR and complete their service request resulting in termination and loss of opportunity.

The NICR will use these codes to make routing decisions. The NICR routing decision for each call will be based on a combination of factors including the best available agent pool to sell the most profitable offer and the callers probability of acceptance indicator. When the call arrives at the NICR selected ACD split/skill, it is terminated at an agent station. The CTI Server then sends the agent extension and Session ID to the host. The Host will use the information passed by the CTI Server to drive the screen POP per the current process. The screen POP process will deliver information about the caller to the agent. If all has worked well, the agent's particular level of authorization (which determines the palette of offers that the agent can make to the caller) will match top offer that the agent can make to the caller.

The goal is to get the caller most likely to buy the most profitable product to an agent who can make this offer. To this end there will be three levels of agent talents (i.e.: proven ability to sell), sub-divided by the offers they are trained/authorized to make. a. Level 'A', these agents are proven high level producers b. Level 'B', these agents produce sales and are being trained to increase their sales ability. c. Level 'C', these agents are utility representatives that provide good service, but are still coming up the sales curve. Initially there may not be a 'C' group, with this function being handled by the existing Main Gate. Those callers with a high propensity to buy products will be connected with the agents with the best track record for making sales.

In one embodiment, the host provides a single offer type (based on four available) without any profit/probability code. The NIVR will pass the offer type in the ANI field (as SBU is done today) for routing purposes by the NICR. NICR will route calls to the specialty support splits based on certain split and agent status.

In another embodiment, the host provides two routing offers with some level of profit/probability. The NIVR will need to pass this information to the NICR. In this phase ANI may still suffice for passing product and profit/probability codes. Now, however the NICR will decide which agent group to route to based on two offer types and certain split and agent status.

In still another embodiment, the host will send information on multiple offers and their relative profit/probability quotients to the NIVR. The NIVR will be required to provide this information to the NICR, requiring some other methodology. The NICR will in turn be required to use extensive scripting logic to make routing decisions based on the relationship of offer/sales likelihood and provide instructions back to the network.

The current NIVR to NICR messaging is restricted to the use of a ten-digit field known as the ANI. The ANI field typically houses the telephone number that originated the call. This field can be changed for a referred call as the NIVR actually originates the extended call. The change is referred to as the manipulated ANI.

Typically the first three digits (the area code) are left intact to allow some emergency DAP routing, in event of an NICR failure. The last five digits are used to identify the Session ID of the call being referred. This leaves two remaining digits (the two high order digits of the exchange) to pass routing information to NICR. Currently these digits are providing information for SBU purposes. These two digits can provide sufficient information to route calls based on four product and two levels of agent ability. To support the full level of customer routing capabilities, desired by the business an enhancement to, or replacement of, the current routing instruction method between the NIVR and NICR will be required.

The system requires NIVR to send NICR host provided information on five products for each call. This information includes numeric indicators that determine profitability of the offer and the probability of the customer accepting the offer. The proposed NBS process requires that NIVR be able to send NICR a larger amount of information on which to make routing decisions for referred C/S calls.

There are several ways of delivering routing information from the NIVR to the NICR platform. These include a direct connection from the host to NICR, NIVR/NICR integration (either tightly or loosely coupled), Network CTI integration (i.e.: Network VESP), and use of UUI. The present invention contemplates that all of these methods of connection could be used.

With regard to the loosely coupled integration of the NIVR/NICR, the NIVR is coupled to the NICR by way of a message set sent from NIVR through an independent data stream and stored by some method (either logger or adjunct database) at both NICR Nodes. This will also require activation of the database routing feature in the NICR platform.

Here, a one-way data connection is set up between the NIVR and NICR platforms. A message set will pass from the NIVR for each referred call containing: (1) DNIS of the original call (7 or 10 bytes), (2) Manipulated ANI (including a 5 digit Session ID), (3) call type (SBU, NRI, NBS, etc) or 2 bytes, (4) account offer information (each 6 bytes, 2-Product, 2-Profitability & 2-Probability) totaling 30 bytes, and (5) an undefined field for future uses totaling at least 32 bytes.

The NICR will store this information in a temporary database located within the logger process or housed on an adjunct processor. In either case the process will use the DNIS and Session ID as the key. The record will be written into the database using the Session ID as the key. When the database writes the new record it will set a "Previously Read" field to "N" (no). The DNIS (VDN) and Session ID has conventionally acted as the host "key" to activate the screen POP. In this configuration these two fields will perform the same function at the NICR, allowing NIVR to provide an unlimited amount of information from the host (or another source) to the NICR for call routing. Based on the DNIS (backend 800 number) of the call and the Session ID, NICR will use the Call Type (provided by the NIVR) and Call Information (provided by the host) to route the call to the best skill/split.

The NIVR message set can be delivered in one of two methods, either (1) sent in duplicate form from the NIVR to both NICR systems or (2) sent as a single message to a co-located (with the NIVR) NICR Peripheral Gateway which is interfaced to both NICR systems. In addition to the new messaging between the NIVR and NICR, the NIVR will manipulate the ANI. The 'NX' field will contain a 2-digit code that indicates the top offer to NICR in event that the message set fails to reach the NICR database before the call routing request.

Within the present invention, the following terms are used. Host is a generic term that describes a number of mainframe computers supporting various databases, files and network connectivity that work together to supply account data to the agent work stations and NIVR platforms. Needs-Based-Selling (NBS)is a process designed to get potential customers connected to specialized agents trained to sell specific products.

Network Intelligent Call Routing (NICR) is a system that provides call routing instructions. The system bases it's decisions on the status of the various ACD systems, down to the agent split/skill levels.

Network Integrated Voice Response (NIVR) is a platform that supports various automated agent call flows and connections to host databases.

Screen POP is a term used to describe many functions that work together to provide an agent with a screen of account data associated with the call being terminated at their workstation.

Session ID is a five-digit field that is used to match a NIVR transferred call with associated account information contained in temporary storage (temp storage) in the host. The Session ID is established by the NIVR platform at the start of each successful ANI or Account Match host transaction. The Session ID is sent to the host on the first 'dip' associated with the call, each subsequent 'dip' for that call is identified with the same Session ID. When a 'host matched' call is transferred, the Session ID is placed in the last five digits of the ANI field. The first digit of the Session ID identifies the NIVR node that the call originated from and is used by the receiving CICS region to determine the CICS region that handled the NIVR quires. The last four digits contain the temp storage address of the actual account information.

ANI field is passed to the host via the CTI server when the call is terminated at an agent's station set. The host matches the Session ID for both CICS region and temp storage location and sends the associated information to the agents CRT.

A further aspect of the present invention is the Computer Telephony Integration (CTI) 'screen pops' and the associated Server/Host/NIVR development. The 'screen pop' is a coordination of voice and data information regarding the customer's relationship to the agent workstation. It enhances customer service by minimizing customer identification and reduces operating cost.

In one embodiment of the invention, the system delivers a "screen pop" to the agent workstation based on the customer exit point in the Network Interactive Voice Response (NIVR) application. This allows the simultaneous delivery of voice call and specific account data to the agent desktop. Another embodiment of the invention provides the account information and attempts matching on the caller's ANI (Automatic Number Identification) if the Customer Identification Number (CIN) entry is unsuccessful.

For example, a bank may have multiple and varied business functions/call centers with different delivery goals. These units might work together and periodically handle each other's volume to provide a complete "retail" banking relationship to the customer. In such a system, the primary customer interface is an automated voice response application that runs on an Network Interactive Voice Response platform. This allows customers to access their accounts to obtain current balance information or transfer funds between accounts. This activity is allowed after the caller successfully enters their 14 or 16 digit CHIN and their 4–6 digit Telephone Personal Identification Code (TIC).

Customers from different marketplaces can access the application via various 800 numbers. The NIVR application defines marketplace and product based on the incoming number until the marketplace is identified by a successful CHIN entry. Customers opting out of the NIVR application are connected to a live agent, but no data is transmitted to the agent's workstation. Referral calls are sent on product, market and exit point specific back-end 800 numbers. The Dialed Number Identification Service (DNIS) of these numbers coming into the network telephony switch invokes a dictionary marketplace name to be displayed on the agent's phone display.

Conventionally, the agent would start the customer session without data on a generic Graphical User Interface (GUI) workstation screen. The agent would manually input the geographical area identification into his/her workstation. The agent would then request customer information (CHIN, Account numbers), although the caller may have previously entered it in the NIVR application. This caller re-prompting is both inefficient and irritating to customers.

The present invention provides a system that delivers a 'screen pop' with a referred call. The process interacts with the NIVR platform, the Automatic Call Distributor (ACD) and Host application/CTI server to supply sufficient information to deliver the call and appropriate account information to the workstation. The system also integrates with the Network Intelligent Call Route (NICR) system to enhance call routing.

The CBI functionality provides voice and data transfer functionality from the NIVR to the call center agent. It can, in one embodiment, be limited to a number of existing screens; these being generated based on NIVR exit points. The screen pop will identify the marketplace even if the customer did not enter digits. If the customer was identified via CIN and TPIC, the system will automatically navigate to the appropriate screen, eliminating the need for the agent to re-identify the customer and call context based on where the customer left the application.

The NIVR platform and system support a variety of host connectivity LU 0, LU 2, LU 6.2, TCP/IP, and X.25 protocols (LU=Logical Unit, TCP/IP=Transmission Control Protocol/Internet Protocol). In addition, the platform is supports multiple messaging. The NIVR application generates a "Placeholder" message session on each referred call, which is passed with the call and to the Host for coordination of matching data and voice. The "Placeholder Tag" is a ten digit field (NPA-uvw-xxxx) which contains the Call ID and Host ID.

The present invention also allows the secondary transfer of screen information from one agent to another or a supervisor's workstation.

The 'screen pop' design should allow the redirection of the call to another site to meet COB requirements. This rerouting of the call maybe supported without screen POP if the COB site does not support the USCC CTI.

If the CTI 'screen pop' hardware or software fails the call will revert back to the call flow path with voice data passing to the representative.

In one embodiment, a bank would have a call center sited at one location. This site receives retail banking calls from numerous marketplaces in the United States. The marketplaces vary in size and have multiple bank identifiers (FIMP Codes). The calls are delivered to the call center agent by a method, in which the NIVR application receives calls from the retail bank marketplaces and, based on an internal matrix of calling tagging information, routes the NIVR referral traffic to the appropriate agent based on the back-end number and site DNIS. The referral numbers can be located on a product/marketplace table.

In one example, there might five pieces of caller information that the institution would use for call termination: (1) identification of the caller, (2) product associated with the call, (3) Language the caller chose to use, (4) marketplace or FIMP from whence the call originated or the actual information about caller, (5) location in the NIVR application that the caller came from.

The NIVR application allows the customer to select language, self-service or a live agent from his/her initial contact. Based on a hierarchy of business rules and assumptions made upon customer input (or lack thereof), the NIVR application transfers the call to the ACD systems, by market/exit point/language. The referral back-end numbers are determined via mapping of marketplace, product, language (e.g., English or Spanish) and the call flow or based on an exit option table matrix.

The agent would receive acronyms displayed on the Telephone-set based on pre-defined Vector Directory Number (VDN's) for selected referrals, in one embodiment.

The present invention is a system that can run in numerous diverse NIVR node locations. System Network Architecture/Synchronous Data Link Control (SNA/SDLC) data lines provide host connections. The individual host lines can run in pairs from each node, running to redundant Network Control Processors (NCP). Each of the lines can be coupled with multiple PU's (PU=Physical Unit) and have LU's that can be routed to either primary or back-up CICS regions. These LU's support various host transactions that are used to validate customer information and to send a host MIS record at the termination of each call.

The agent's workstation has a host connection. Agents access customer account information in via a process that parallels the NIVR systems.

The overall design is based on the NIVR generating a "Placeholder Tag" on each call referral. This tag is stored in the host (with additional data elements) and made an integral part of the voice transport (ANI) message set. The tag is made up of two sections, Call ID and Host ID. The host "Placeholder Tag" is part of a larger message set called the data element message. This tag allows the voice call to be re-associated with the data element message when the referred call (from the NIVR) is received at the agent station.

The "Placeholder Tag" within the NIVR application serves many purposes. The "Placeholder Tag" in the Voice calls ANI message field is passed by the ACT to the CTI Server when a call is connected to a station. The CTI server uses the Host ID portions to generate "screen pop" on every referred NIVR call. The CTI server passes the ANI tag to the host to be matched with the message sent by the NIVR application. The host retrieves the call information and sends it to the CTI server. The information is used later to build the workstation request for the screen pop based on the specific NIVR application exit point of the caller. The Network Intelligent Call Router (NICR) uses the Call ID portion of the message generating call routing instruction.

The value of each "screen pop" will be related to the customer's NIVR activity, defined in the data element message sent to the host. If the customer opted out of the NIVR application prior to entering a valid CIN and TPIC a limited amount of information is available; marketplace and product. If the customer has successfully input their CIN and TPIC and selects products linked to their card, this message will provide a detailed level of information (account balance, transfer of funds and transaction) from which the CTI platform builds a more detailed 'screen-pop'.

The present invention provides for caller information in the "Placeholder Tag" to be used for voice call routing. Such information can include the product associated with the call (Referral Dialed Number), the marketplace or FIMP where the call originated (ANI, Interchangeable Numbering Plan Areas (NPA or area code)), language, English or Spanish, the caller chose to use (1st digit of ANI NXX field "u"); location in the NIVR application that the caller came from (2nd digit of ANI NXX field, "v"); and identification of the caller, Session ID (3rd digit of ANI NXX and the four address digits, "w-xxxx").

In one embodiment of the present invention, the system provides a high-level "screen pop" via NIVR Host/CTI integration. In this process the NIVR tags a voice call with a "Placeholder Tag" and data element message (w/Placeholder) to the host. The network then sends the Placeholder Tag (ANI) to CTI server/host to retrieve a data element message. Using the Placeholder Tag, the CTI server retrieves the data element message from the host and inserts it in the UUI field "attached" to the current call's VDN. The network connects calls to an agent group based on Vector and VDN instructions. The network notifies the CTI server of the agent extension that the call was connected to. The CTI Server associates the agent extension number with workstation's terminal ID, and causes a "screen pop" on the work station based on the NIVR supplied information.

The system also identifies one or more of the routing requirements to the NICR system. This allows the system to determine the best location/agent group and supply the appropriate call routing instruction to the voice network.

This NIVR/Host identification of each agent-transferred call can be facilitated via a NIVR host record message sent at the end of each call. The NIVR host message set on all the applications will consist of the "Placeholder TAG" (Call ID and Host ID), based on pertinent fields of information about the callers call flow 'exit point'.

In one preferred embodiment of the present invention, the structure of the ANI message will be consistent and portable across all Retail products, whether they are interactive (i.e.: host interface) or are auto-attendants. The ANI and Dialed Number will provide information needed by the NICR, ACD and CTI system for call identification and call routing.

In an aspect of the present invention, the NIVR will provide a manipulated ANI (Call ID/Host ID) on all calls transferred from the application. The Network Integrated Call Router (NICR) is used for call-by-call routing decisions based on both DNIS and ANI of the call. Here, the NICR system will read both the back-end 800 and the "Call ID" portion of the ANI (NPA-uv) to determine and assign the call a 'call type.' This call type is then applied to the 'script' (business provides routing rules) which determines the best location to route the call based on agent availability or minimum expected delay. The NICR provides the voice network the necessary instruction to route the call. The ACD provides call handling instructions to connect the call to proper the desired skill group, split or agent. The ACD uses the incoming DNIS/VDN of the call to determine internal routing. The system also coordinates the call with the proper screen pop to the agent workstation. Manipulated ANI, DNIS and ACD extension information on each call is sent to the host. The extension of the call is used to ID the LU for the 'screen pop'. The DNIS of the call is used by the host application to determine if the ANI field has either been manipulated or a real ANI is used. The manipulated ANI Host ID (wxxxx) provides the-Host/CTI system with a cross-reference number, which is used for a table lookup for the valid 'Placeholder TAG'. The host then sends the Data Element information corresponding to the NIVR exit point. The CTI Server provides caller context information to the workstation associated with the call termination. The caller context information is used by the Workstation server to generate a host terminal request.

The NIVR "Placeholder TAG" is the key to creating the Call ID and Host ID coordination between the call termination and the arrival of the 'screen pop'. The matches within the system rely on the "Placeholder TAG" that will, in essence, be a manipulated ANI field.

In one preferred embodiment of the present invention, the following ANI/DNIS format is used.

| Manipulated ANI Field | Back-end Dialed Number |
|---|---|
| NPA-uvw-xxxx: (MPA-uv) Call ID \| Host ID (w-xxxx) | zzz-zzz-ZZZZ |

NPA = Actual area code of caller (Id's the marketplace in DAP/NICR)
z = Product
u = Language of (2–9) 2 = Eng, 3-Span
v = Exit location within the application (0–9)
w = NIVR node digits 1–3 (1–9 available)
x = Host session/Call ID (0001–9999)

The NIVR application when combined with NICR provides a high level of flexibility in call routing (between multiple ACD's and sites) and delivery of customer account information.

The Network Intelligent Call Router (NICR) provides call by call routing based on customer defined business rules to determine the site and split to service the call. These rules allow routing decisions based on the Placeholder, Back-end referral numbers information and call center information (Longest Available Agent and Average Speed of Answer) provided by the ACD's. NICR provides DNIS override functionality that reduces the number of back-end numbers. NICR provides functionality to permit load balancing between sites; permit routing distinctions based on Agent Splits/Skills sets and products; and permits routing to alternate sites based on site outages or closings, high or low queue times; or time of day or day of week routing rules.

The NIVR, NICR and Host/CTI system work together as follows:

In another preferred embodiment of the present invention, the NIVR sends the host a 'Placeholder' tag and Data Stream Message to the host on all NIVR referrals. The system can Immediate Referrals, No-match (CIN entry fails) and Match calls in the same manner, providing as much information as possible concerning the exit point. Additionally, the NIVR will tag the voice side of referred call with a corresponding 'Placeholder' tag for network and ACD routing in the form of a manipulated ANI. The NIVR sends the host a message for each call. This message will contain the Call ID (unused) and Host ID (5 digit Session ID in round robin) and NIVR exit point information. In a preferred embodiment, it provides the ANI of caller, the incoming 800#, FIMP and time-out status information for a blank 'screen pop'. If the caller passes CIN entry the message will contain specific information identifying where the caller exited the call flow. This information will be stored in temporary memory until retrieved by the CTI. The NIVR application sends corresponding 'Placeholder' in the ANI field. The area codes (NPA) are manipulated so that there is one for each marketplace. The remaining seven digits to provide high-level information concerning language, NIVR exit point and Session ID information.

In another aspect of this invention, the NICR uses the ACD agent state information and a portion of the ANI to determine where to route the call. The NICR uses the ANI field to determine which DNIS will be used at each site to route the call type to the appropriate split/skill. Rules are used to write the NICR scripts. These rules will identify which site to route calls to and the agent split by marketplace.

The ACD routes the call to the appropriate agent split-based on the DNIS/VDN of the incoming call. The ACD provides the CTI Server with the 'Placeholder' tag necessary to coordinate the customer call with the host message. The ANI (along with other information) is sent to the CTI server when the call arrives. When the call is transferred to an agent the extension information is provide to the CTI server. The Agent extension, manipulated ANI and DNIS are sent by the ACD to the Client Server. The ACD uses the DNIS to determine the split the call will be routed to based on caller language, marketplace and script location where referral request occurred. The ACD routes the call to the appropriate agent and notifies the CTI Server of their extension.

The CTI Server uses 'Placeholder' tag (manipulated ANI) to associate the call at the agent desktop with the host request for screen pop information. The Client Server forwards the 'Placeholder' (manipulated ANI) to the host to be matched to the account information stored in the session file. The host matches the account status and sends the corresponding Data Stream Message to the CTI Server. When the ACD provides agent/call connection information to the CTI server, the Workstation and Application Server use the data element retrieved by the CTI server to request the screen pop. The screen is delivered by the host to the agent containing specific account information.

In another aspect of the invention, the "Placeholder Tag'is a ten digit field (NPA-uvw-xxxx) created by the NIVR. It contains two sections, the Call ID and Host ID. The Call ID portion of the tag is used by the NICR for call routing. The Host ID portion of the tag is used to coordinate the voice call to the screen pop.

The Host ID section consists of five digits. The first of the five digits, "w" identifies one of the three NIVR nodes that the call was originally handled in. The remaining four digits, "xxxx" make up the session identifier (a round robin counter) number starting from 0000 to 9999, then returning to 0000.

As will be appreciated, the message format can contain additional information, such as, the account list including: account #, Product ID, CK+Flag, Acct Status and Acct type data elements that make up the customer profile.

The CTI Server dynamically builds an index file to match station extension to LU address and uses ACD call information to prompt host lookup and screen pop activity. In addition, the serves uses 'Placeholder Tag' on incoming calls to make request to the host to retrieved Data Elements and uses call Data Elements to stage workstation request for account information based on context. The server also initiates a process to allow terminal request for Workstation Screen POP process to support FIMP based 'blank' screen pop for no match, Immediate and CIN failure referrals; ANI match calls, with FIMP, product and CIN populated home screens; and CIN match calls, with screen POP based on the NIVR call flow location during referral.

The host builds a temporary file for 'housing' the 'Placeholder Tag' Messaging with Data Elements' until it is requested by the CTI Server for matching to Agent call and screen pop. The host also build a process to support the CTI Server request to retrieve 'Placeholder Tag and Data Elements.'

The NIVR 'Placeholder Tag' Messaging with Data Elements' message is sent to the host for each transferred call prior to the existing host MIS message. This 'Host ID' messaging contains pertinent information about the caller marketplace (FIMP based on DNIS or CIN), identity (i.e.: CIN), and call flow 'exit point' (Savings, Checking, etc.).

The message element is held in temporary memory storage. The CTI retrieves the information and holds it until the corresponding call is delivered to an agent. The link uses a host based MQ server running LU6.2 over the GRN IP network. After the ACD validates agent connection, a request is staged to the Workstation/Server software and made for the corresponding screen matching the exit point. This screen is delivered to the workstation almost simultaneously with the call, depending on host, server or network response times.

The diagram on the following page is a pictorial representation of how NIVR/CTI interface is designed down to the agent's workstation.

In another embodiment of the present invention, the host and CTI applications allow an ANI match process to be performed on no-match calls. No-match calls are defined as referred calls that did not successfully enter a valid CIN entry point. The application will attempt a file look-up on when a call is referred without the CIN entry in the message set. The resulting CIN match(s) information is then appended to the call record and stored for retrieval by the CTI application. In this embodiment, the system will build an ANI/CIN cross-reference file and program to search for and notify/update the temp storage record of a CIN/ANI match(s). The agent will verify the correct CIN relationship with the customer prior to any account information being provided.

Although the invention has been described with reference to these preferred embodiments, other embodiments can achieve the same results. Variations and modifications of the present invention will be apparent to one skilled in the art, and the above disclosure is intended to cover all such modifications and equivalents.

What is claimed is:

1. A method of transferring a call signal including call-related data received from a communications system between a host and at least one remote agent terminal connected through a network, where the host can access at least one application database for storing and retrieving information associated with each service that each agent terminal is to handle, and each agent terminal can access the at least one application database computer system for storing and retrieving information associated with each service that each agent terminal is to handle, the method comprising the steps of:

(a) at the host (i) transferring initial information contained in an ANI field associated with the call signal into the at least one application database, (ii) associating that initial information contained in the ANI field with other information regarding the source of the call signal, and (iii) replacing the initial information contained in the ANI field associated with the call signal with subsequent information contained in the ANI field directing an agent terminal to a portion of the at least one application database that contains the initial information contained in the ANI field associated with the call signal and the other information regarding the source of the call signal;

(b) transferring the call and the subsequent information contained in the ANI field from the host to the at least one agent terminal by transferring the voice portion of the call to a voice communication device of the at least one agent terminal, and transmitting the subsequent information contained in the ANI field directing the at least one agent terminal to the portion of the database that contains the initial information contained in the ANI field associated with the call signal and the other information regarding the source of the call signal;

(c) at the agent terminal, (1) receiving the call signal and information contained in the ANI field directing the at least one agent terminal to the portion of the database that contains the initial information contained in the ANI field associated with the call signal and the other information regarding the source of the call signal, wherein a product code and sale score are a component of the subsequent information contained in the ANI field, which product code and sale measure product profitability and probability of offer acceptance for the caller.

2. A system for transferring a call signal including call-related data received from a communications system between a host and at least one remote agent terminal connected through a network, where the host can access at least one application database for storing and retrieving information associated with each service that each agent terminal is to handle, and each agent terminal can access the at least one application database computer system for storing and retrieving information associated with each service that each agent terminal is to handle comprising:

(a) a host;
(b) at least one remote agent terminal;
(c) a network;
(d) at least one application database;
wherein the host transfers initial information contained in an ANI field associated with the call signal into the at least one application database, (ii) associating that initial information contained in the ANI field with other information regarding the source of the call signal, and (iii) replacing the initial information contained in the ANI field associated with the call signal with subsequent information contained in the ANI field directing an agent terminal to a portion of the at least one application database that contains the initial information contained in the ANI field associated with the call signal and the other information regarding the source of the call signal;
wherein the call and the subsequent information contained in the ANI field is transferred from the host to the at least one agent terminal by transferring the voice portion of the call to a voice communication device of the at least one agent terminal, and transmitting the subsequent information contained in the ANI field directing the at least one agent terminal to the portion of the database that contains the initial information contained in the ANI field associated with the call signal and the other information regarding the source of the call signal;
wherein the agent terminal receives the call signal and information contained in the ANI field directing the at least one agent terminal to the portion of the database that contains the initial information contained in the ANI field associated with the call signal and the other information regarding the source of the call signal, wherein a product code and sale score are a component of the subsequent information contained in the ANI field, which product code and sale measure product profitability and probability of offer acceptance for the caller.

3. A method of processing a call, said method comprising the steps of:
providing a call processor which receives information associated with said call;
receiving said information including dialed number, and the calling number (ANI) associated with said call;
analyzing the ANI of said call;
substituting a new caller identification in the ANI field; and
handling the call based on the new caller identification and dialed number,
wherein a product code and sale score are a component of the subsequent information contained in the ANI field, which product code and sale measure product profitability and probability of offer acceptance for the caller.

4. The method of claim 3, wherein said information is network data.

5. The method of claim 3, wherein said information is resource data.

6. The method of claim 3, further comprising the steps of:
prompting said caller for additional information;
processing said additional caller information; and
handling said call in a particular way based on said processing.

7. The method of claim 6, wherein said caller information is touch tone information wherein a short touch tone represents a data entry and a long tone represents a command.

8. A telephone call processing method, comprising:
providing a call processor which receives information associated with a call;
receiving said information including the calling number (ANI) associated with said call;
analyzing said information to determine the source type of said call;
prompting caller of said call via an automatic voice response unit for a new caller identification different from said received calling number (ANI), said new caller identification representing data about the actual caller; and
storing said new caller identification,
wherein a product code and sale score are a component of the subsequent information contained in the ANI field, which product code and sale measure product profitability and probability of offer acceptance for the caller.

9. A telephone call processing method, comprising:
providing a call processor which receives information associated with a call;
receiving said information including the calling number (ANI) associated with said call;
analyzing said information to determine the source type of said call;
prompting caller of said call via an automatic voice response unit for a new caller identification, said new caller identification representing data about the actual caller different from said received calling number (ANI);
storing said new caller identification; and
replacing said received calling number (ANI) with said new caller identification by storing said new caller identification in said data field used by said received calling number (ANI),
wherein a product code and sale score are a component of the subsequent information contained in the ANI field, which product code and sale measure product profitability and probability of offer acceptance for the caller.

10. A telephone call processing method according to claim 9, further comprising the step of:
transferring said call to another location with said information associated with said call, said information including said new caller identification.

11. A telephone call processing method according to claim 10, wherein said new caller identification is the actual phone number of the caller.

12. A telephone call processing method, comprising the steps of:
providing a call processor which receives information associated with a call;
receiving said information including the calling number (ANI) associated with said call;
analyzing the NPA-NXX of said calling number (ANI) to determine the source of said call; and
modifying the call path of an automatic voice response script based on the determination of said source of said call,
wherein a product code and sale score are a component of the subsequent information contained in the ANI field, which product code and sale measure product profitability and probability of offer acceptance for the caller.

* * * * *